United States Patent [19]

Rodier

[11] 4,173,613

[45] Nov. 6, 1979

[54] PROCESS FOR PRODUCING CELLULOSIC SHAPED ARTICLES

[75] Inventor: Henry Rodier, Sainte-Foy-Les-Lyon, France

[73] Assignee: Rhone-Poulenc-Textile, Paris, France

[21] Appl. No.: 815,850

[22] Filed: Jul. 14, 1977

[30] Foreign Application Priority Data

Jul. 16, 1976 [FR] France ................................ 76 22032

[51] Int. Cl.$^2$ ............................................... C08L 1/24
[52] U.S. Cl. ..................................... 264/187; 264/188
[58] Field of Search ................. 264/187, 188; 106/163, 106/168; 8/116.4

[56] References Cited

U.S. PATENT DOCUMENTS

| | | | |
|---|---|---|---|
| 3,236,669 | 2/1966 | Williams | 106/163 |
| 3,706,526 | 12/1972 | Swidler et al. | 8/116.4 |
| 4,022,631 | 5/1977 | Turbak et al. | 106/168 |
| 4,028,132 | 6/1977 | Litt et al. | 106/163 R |
| 4,044,090 | 8/1977 | Portnoy | 106/163 R |

Primary Examiner—Jay H. Woo
Attorney, Agent, or Firm—Murray & Whisenhunt

[57] ABSTRACT

A process for producing shaped articles of cellulose is disclosed, wherein a solution of cellulose in dimethylsulphoxide (DMSO) and formaldehyde, at a formaldehyde/cellulose weight ratio of 0.2 to 2, and at a cellulose concentration of at least 6% by weight based on the volume of DMSO, is spun into a coagulant bath. The coagulant bath contains water, DMSO and ammonia or an ammonium salt, with the DMSO present in an amount of about 25 to 60 weight percent of the mixture of DMSO and water. The ammonia or ammonium salt is present in an amount, calculated as ammonia, of at least 1 gram per liter in the mixture of DMSO and water.

The use of the coagulant bath of the present invention permits the cellulosic solution to be formed into shaped articles, and especially into filaments which are useful in the textile field. Other shaped articles which can be made from the cellulosic solution include fibers, threads, membranes, films, and sheets.

11 Claims, No Drawings

PROCESS FOR PRODUCING CELLULOSIC SHAPED ARTICLES

BACKGROUND OF THE INVENTION

The present invention relates to the spinning or other shaping of cellulosic solutions to produce filaments, fibers, membranes, films, sponges and the like.

Previously used cellulose solvents were generally sulphuric acid and phosphoric acid, which tend to degrade the cellulose by causing severe hydrolysis, or complexes of heavy metals and amine compounds used in the cuprammonium process, which complexes are rather uneconomical to use because the solvent cannot be recovered directly but only in an indirect and complicated manner.

The prior art has also known other solvent complexes or solvent mixtures for cellulose. Thus, the prior art has used ferric/tartrate complexes or mixtures of dimethylsulphoxide with dimethylacetamide or nitrogen dioxide, or sulphur dioxide and an amine. Because of major technical and/or economic problems, however, such complexes or mixtures have not lead to industrial spinning processes.

The most widely used spinning process includes an initial chemical conversion of the cellulose in order to produce a soluble intermediate product, cellulose xanthate, followed by a fresh chemical conversion to regenerate the cellulose. In such a process, significant consumption of chemical reactants, and especially a major loss of carbon disulphide, is involved.

Johnson et al, IPC Technical Paper Series of The Institute of Paper Chemistry, No. 5 (Apr. 1975), report that they are able to dissolve cellulose, at very low concentrations, mainly 1 to 3% by weight/volume, in dimethylsulphoxide (DMSO) containing a large amount of formaldehyde relative to the amount of cellulose (on the order of 5 to 20 times the weight of the cellulose). Solutions of such low concentration are completely unsuitable for shaping on an industrial scale to produce filaments, fibers, membranes, films, sponges and the like, and the yield of the process of dissolving the cellulose is extremely low, because in most cases a large undissolved residue remains, which can represent up to 37% of the weight of the pulp, which is only employed at the rate of 1% relative to the DMSO. In addition, the high paraformaldehyde content interfers with the subsequent shaping operation. The described cellulosic solutions are extruded through a syringe into a tray of methanol, to produce a fibrous product. Such a process is clearly unsuitable for industrial application, as it does not involve a rapid coagulation, compatible with a continuous spinning process, and does not produce a gel capable of withstanding the spinning tensions, and hence does not lead to fibers of suitable properties. These authors teach that solutions of higher cellulose concentration can only be obtained from cellulose having a low degree of polymerization. As is known to the art, these celluloses of low degrees of polymerization are not found in the natural state, and can only be obtained by a prior chemical treatment of native cellulose, with consequential considerable increase in cost. Furthermore, filaments produced from celluloses having low degrees of polymerization have generally poor properties and are sometimes unsuited for textile applications.

French Patent application No. 2,311,783, published on Dec. 17, 1976, claiming U.S. priority of an application filed on May 19, 1975, discloses a process for spinning solutions of cellulose in DMSO and formaldehyde. The French patent application describes solutions containing at least 0.8 parts by weight of aldehyde per part of cellulose, and 2 to 14% by weight of cellulose per volume of DMSO, which can be spun into an aqueous solution of a pH>7 containing compounds such as ammonia liquor or ammonium salts. The filaments provided have such poor properties, and especially a very low elongation, as to render them unsuitable for textile applications.

SUMMARY OF THE INVENTION

The present invention relates to a continuous industrial process for the manufacture of cellulosic fibers by a chemical method, with the resulting fibers having good textile properties. The present invention also relates to shaping of other articles, such as films. For a greater convenience, the term spinning will in the text which follows be used for the shaping of filaments, fibers, membranes, films, and the terms fibers or filaments will be used to also include other shaped articles such as membranes, films or sheets.

The process of the present invention produces shaped articles of cellulose by placing a cellulosic solution in the desired shaped form and then contacting the cellulosic solution while in said shaped form with a coagulant bath. The cellulosic solution contains cellulose and dimethylsulphoxide (DMSO) and formaldehyde at a formaldehyde/cellulose weight ratio of about 0.2 to 2. The cellulose concentration in the solution is at least 6% by weight, based on the volume of DMSO. The coagulant bath contains water, DMSO and ammonia or an ammonium salt, and the DMSO is present in the amount of about 25 to 60 weight percent, based on the amount of DMSO and water present. The ammonia or ammonium salt is present in amounts, calculated as ammonia, of at least 1 gram per liter of the mixture of DMSO and water.

DETAILED DESCRIPTION OF THE INVENTION

In order to obtain filaments or fibers having good textile properties it is decidedly preferred to start from a cellulose having a degree of polymerization (DP) of at least 400, and more preferably between 400 and 1,100, although celluloses with a higher degree of polymerization can also be used. Suitable solutions are described in the application filed of even date herewith in the names of Jacques Menault and Henry Rodier, entitled "Spinnable Cellulose Solution and Process for Making Same", attorney docket RPT-24, the disclosure of which is hereby incorporated by reference for the teachings of suitable solutions therein.

The formaldehyde/cellulose weight ratio in the cellulose solution in the DMSO/formaldehyde mixture must be between 0.2 and 2. Briefly, this can be achieved by dissolving the cellulose, preferably a native cellulose which has been previously dried, in a heated mixture of DMSO and formaldehyde in such amounts that the formaldehyde/cellulose weight ratio is at least 1 and preferably between 1 and 2. The formaldehyde is conveniently used in the form of paraformaldehyde. The DMSO preferably contains less than 1,000 ppm of water, and the less accessible the cellulose which is to be dissolved is, the lower the amount of water must be.

It is known to the art that the possibility of causing the cellulose molecules to react, or of solvating the cellulose molecules, is to a large part determined by the architecture in which the cellulose molecules are involved in the solid state. The art has characterized the ease of penetration of a reactant into the texture of a cellulose by making general resort to the concept of accessibility. Cellulose accessiblity depends in a complex manner on the length of the chains of the cellulose, the means DP, the size of the crystalline and amorphous zones and the fibrillar structure, which characterize the morphology of the cellulose fibers in question.

The formaldehyde/cellulose weight ratio depends to a large extent upon the accessibility of the cellulose which is to be dissolved to form the solution. Thus, for certain native celluloses exhibiting relatively low accessibilities, a rather high formaldehyde/cellulose weight ratio will be utilized. In general, the formaldehyde/cellulose weight ratio will increase with a decrease of the accessibility of the cellulose which is to be employed.

It is advantageous to carry out the dissolving process at an elevated temperature, preferably of 90° to 130° C., although lower or higher temperatures could be used if desired. The use of such lower or higher temperatures does not provide any advantages, however. It is also preferred to heat the DMSO before introducing therein the cellulose which is to be dissolved.

The amount of cellulose in the solution is at least 6% by weight per volume of DMSO, that is, at least 60 grams of cellulose per liter of DMSO, and can be much larger, for example, 20% w/v or more, depending upon the subsequent use to which the solution is to be put and the accessibility of the cellulose.

After the dissolving step is completed, the formaldehyde/cellulose weight ratio is reduced, if necessary, to a value of between 0.2 and 2, by removing the free formaldehyde, or formaldehyde combined with the cellulose. This formaldhyde removal can be any known means, including driving off the formaldehyde by use of anhydrous, preferably inert, gas, or by distillation under reduced pressure. This step of reducing the formaldehyde content can be conducted without risk of forming gels or coagulation of the solution, provided that the formaldehyde/cellulose weight ratio remains at least as great as 0.2. After the formaldehyde/cellulose weight ratio has been reduced to the desired range, the amount of DMSO in the solution may be brought back to its original value.

If a cellulose having a DP of less than 400 is used, such as cellulose II, possibly derived from waste products, it is possible to dissolve the cellulose with a formaldehyde/cellulose weight ratio of less than 1, and thus it may be possible to entirely dispense with the step of removing the excess formaldehyde. However, such celluloses having a DP of less than 400 are generally not suitable for the production of the filaments having good physical properties. For this reason, the cellulose used in the solutions of the present invention will preferably have a DP of at least 400.

The coagulant bath contains about 25 to 60% by weight of DMSO in a mixture of water and DMSO, to which has been added ammonia or an ammonium salt in an amount of at least 1 gram per liter of the mixture, calculated as ammonia. The ammonium salts which can be used include, for instance, carbonates, sulfates, chlorides, and the like. However, in the case of using such ammonium salts, it is necessary to use a higher total concentration of the additive than in the case of ammonia. It is believed that the ammonia or the ammonium salts destroy the cellulose/formaldehyde compounds formed during the dissolving process, with formation of hexamethylenetetramine, which can thereafter be removed from the bath. If ammonium salts other than carbonates are used, it is also necessary to neutralize the bath.

The coagulant bath can be at any desired temperature, at ambient temperatures or above or below ambient temperatures. Normally the coagulant bath will be at a temperature of 2° to 45° C., preferably 4° to 40° C.

If the cellulose solution is extruded, into filaments or other shaped articles, it is preferred that the extruded product be extruded directly into the coagulant bath. The shaped product should be contacted with the coagulant bath for a period of time sufficient to coagulate the cellulose in the solution, and this will normally require at least 1 second. It is greatly preferred, for the case of extruding textile filaments, to complete such coagulation in a time of less than 20 seconds, as longer times are difficult to reconcile to commercial practices. A coagulation time of no greater than 15 seconds is especially preferred, and preferably the time is about 5 seconds.

After passing out of the coagulant bath, the filaments can be washed with water if desired, and then are preferably drawn in one or more stages. The drawing of the filaments may be conducted in air or in boiling water or successively in both. However, the drawing step is not indispensible. Normally, each stage will draw the filaments by 10 to 50%.

The cellulose filaments which are obtained by the process of the present invention exhibit good mechanical properties, of the same order as the properties of regenerated cellulose filaments which are intended for textile applications. However, the process of the present invention produces cellulosic fibers in a much more rapid and economical manner. The present process permits the rapid coagulation of filaments, compatible with an industrial, continuous spinning process. The present process is particularly significant because solutions of cellulose in a mixture of DMSO and formaldehyde are difficult to coagulate in a nonsolvent medium.

The solutions which are used in the present process are normally of undissolved fibers and free from gels, as can be confirmed by the two tests described hereinbelow.

The Np, or number of fibrous particles per $cm^3$ of solution, is determined by examination under a polarizing microscope. Counting is effected on the solution introduced into a rectangular microscope cell, using a magnification of 50 X. Particles are counted if their diameter is greater than or equal to 25 microns. This test principally counts the undissolved fibers which form highly birefringent particles which are only slightly swollen, and of which the internal structure can be discerned in polarizing light, as well as certain more or less extensively swollen gels which are more or less birefringent and of which the internal structure can still be distinguished. The solutions are classified, depending upon the number of particles observed, as follows:

Np of less than 100—excellent
Np of 100 to 200—good
Np of 200 to 400—good to satisfactory
Np greater than 400—mediocre In addition to the particles counted by the Np method described above, the cellulose solutions can also contain very extensively swollen particles or gels which virtually have no detectable internal structure, have a refractive index very close to that of the surrounding medium, and are therefore quite difficult to detect by the Np test.

The extent of these gels can be accessed by measuring the clogging index value. This clogging index is determined by filtering the solution under a constant pressure of 2 bars through a filtering medium composed of three superposed assemblies, each composed of a stainless steel gauze of 34 microns mesh size and a stainless steel gauze of 0.610 mm mesh size.

The time of passage $t_1$ corresponding to the passage of a volume of 120 cm$^3$ of solution is determined and then the volume V, which passes through the filtering medium during a time of passage which is $4 \times t_1$, is measured. Clogging index is calculated, using the following equation:

$$I_c = 100 \, V/480$$

The solutions are classified, depending upon the clogging index value, $I_c$, obtained as follows:
- $I_c$ of 90 to 100—excellent
- $I_c$ of 80 to 90—very good
- $I_c$ of 60 to 80—satisfactory
- $I_c$ less than 60—mediocre The solutions which are used in the process of the present invention preferably have an Np value which does not exceed 250 and more preferably does not exceed 200. Most preferably, the Np value of the solutions used in the process of the present invention is less than 100. The solutions used in the present process have a clogging index value $I_c$ greater than 70 and preferably greater than 80.

The filaments produced by the present process have very good physical characteristics, and especially elongation values.

As indicated hereinabove, the coagulant bath contains at least 1 gram of ammonia per liter of the mixture of water and DMSO. There is no definite upper limit of ammonia or ammonium salt which can be included in the coagulant bath, although normally the ammonia or ammonium salt will not be used in an amount, calculated as ammonia, of greater than 100 grams per liter of the mixture.

Normally, the cellulose solution will be at a temperature of at least 20° C. in the spinneret assembly before contacting the coagulant bath.

EXAMPLES OF THE INVENTION

In the following examples, the parts and percentages are expressed by weight, unless otherwise indicated. These examples are presented to illustrate the present invention, without in any way limiting it.

EXAMPLE 1

80 g of sulphate pulp, viscose grade, having a DP of 450 and a moisture content of 6%, were dried to a moisture content of less than 1% and then introduced into 1000 cm$^3$ of DMSO containing 550 ppm of water and 94 g of 96% strength paraformaldehyde, providing a paraformaldehyde/cellulose weight ratio of 1.20. The temperature of the mixture, which was initially at ambient temperature, was raised to 130° C. in one hour with slow stirring, and maintained at 130° C. for three hours with further stirring. The dissolution of the cellulose was complete, as observed under a polarizing microscope. The solution at this point had a viscosity of 550 poises at 20° C., an Np value of 90 and a $I_c$ value of 87.

This solution was extruded at 25° C. through a spinneret having 200 orifices of 0.055 mm diameter into a coagulant bath maintained at 25° C. The coagulant bath consisting of a water/DMSO mixture, in the ratio 70 parts of water to 30 parts of DMSO by weight. 5 g per liter of the mixture of ammonia were added to the coagulant bath.

The filaments travelled a path of 90 cm in the bath and were then withdrawn by a positively driven mechanical device upon which the filaments executed several turns. The filaments then underwent two successive drawing operations, between different pairs of rollers, with the first pair producing a draw of 32% in air, and the second pair producing a draw of 20% in boiling water. The peripheral speed of the last pair of rollers was 15 meters per minute.

The filaments were then washed with water and oiled before being collected on a bobbin and dried. The filaments had the following physical characteristics (wherein the conditioned state refers to maintaining the filaments until equilibrium at 20° C.±2° C. and 65±2% relative humidity);
- gauge—3.7 dtex
- tenacity, conditioned state—21.7 g/tex
- elongation, conditioned state—11.4%
- wet tenacity—12.8 g/tex
- wet elongation—13%

EXAMPLE 2

A cellulose solution was prepared as in Example 1, and after the cellulose dissolution step the temperature of the solution was reduced to 120° C. Thereupon dry nitrogen, also at 120° C., was bubbled through the solution until the formaldehyde/cellulose weight ratio was reduced to 0.25. The resulting solution had a viscosity of 590 poises at 20° C., an Np value of 85 and an $I_c$ value of 84. This solution was extruded at 30° C. through a spinneret containing 200 orifices each of a diameter of 0.055 mm, into a coagulant bath maintained at 30° C. The coagulant bath consisted of a water/DMSO mixture in a weight ratio of 70/30 respectively, to which ammonia was added in the amount of 1.7 g per liter of the mixture.

The filaments traveled a path of 90 cm in the coagulant bath and were then withdrawn from the bath by a positively driven mechanical device, upon which the filament executed several turns. They were then drawn in the same manner as in Example 1, but to an extent of 24% in air in a first stage and 21% in boiling water in a second stage. The peripheral speed of the last pair of rollers was the same as in Example 1.

After washing with water, oiling, collection on a bobbin and drying, under ambient conditions, the filaments exhibits the following characteristics:
- gauge—3.5 dtex
- tenacity, conditioned state—21.5 g/tex
- elongation, conditioned state—11.8%
- wet tenacity—12 g/tex
- wet elongation—13.4%

EXAMPLE 3

Example 2 was repeated, using a coagulant bath maintained at 30° C. which consisted of a water/DMSO mixture in a weight ratio of 70/30, respectively, to which 39 g per liter of the mixture of ammonia was added.

The filaments were spun in the same manner as in Example 2, with the drawing being to the extend of 20% in air and 17% percent in boiling water. The same peripheral speed of 15 meters per minute was maintained on the last pair of rollers.

The filaments which were obtained exhibited the following physical characteristics:
- gauge—3.5 dtex
- tenacity, conditioned state—21 g/tex
- elongation, conditioned state—12%
- tenacity, wet—13 g/tex
- elongation, wet—13.5%

EXAMPLE 4

The same solution as obtained in Example 1 was used in this example, and was extruded at 30° C. through the same spinneret into a coagulant bath maintained at 30° C. The coagulant bath consisted of a water/DMSO mixture in a weight ratio of 53/47, respectively, to which mixture 3.5 g per liter of ammonia was added.

The filaments were spun in the same manner as Example 1, with the drawing in air to the extent of 23%, and the second stage drawing in boiling water to the extent of 15%. The peripheral speed of the last pair of drawing rollers was 14.5 m per minute.

The filaments exhibited the following physical characteristics:
- gauge—3 dtex
- tenacity, conditioned state—20 g/tex
- elongation, conditioned state—13.5%
- tenacity, wet—12 g/tex
- elongation, wet—15%

EXAMPLE 5

The cellulose solution of Example 1 was used in this example, and was spun through a spinneret containing 128 orifices of 0.05 mm in diameter into a coagulant bath maintained at 35° C. The coagulant bath consisted of a water/DMSO mixture in a weight ratio 70/30, respectively, which also contained 100 g per liter of the mixture of ammonium sesquicarbonate $(NH_4)_4H_2(CO_3)_3.H_2O$.

After travelling 90 cm in the coagulant bath, the filaments were drawn to the extent of 36% in a first stage in air, and in a second stage to the extent of 10% in boiling water. The peripheral speed of the last pair of rollers was 15 meters per minute.

The filaments which were obtained exhibited the following physical characteristics:
- gauge—2 dtex
- tenacity, conditioned state—22 g/tex
- elongation, conditioned state—13%
- tenacity, wet—13 g/tex
- elongation, wet—15%

EXAMPLE 6

80 g of bleached kraft pulp, having a DP of 1,050 and a moisture content of 6%, were dried to a moisture content of less than 1% and then added to 1000 cm³ of DMSO containing 500 ppm of water and 94 g of 96% strength paraformaldehyde, corresponding to a formaldehyde/cellulose weight ratio of 1.20. The resulting mixture was heated to 130° C. with stirring over the course of one hour, and was maintained at that temperature for three hours with constant stirring. Thereafter, the temperature of the solution was reduced to 120° C. and maintained at that temperature while a stream of dry nitrogen at 120° C. was bubbled through until the formaldehyde/cellulose weight ratio was lowered to 0.30.

The resulting solution had a viscosity of 2,100 poises at 20° C., an Np value of 250 and an $I_c$ value of 87. The solution was extruded at 20° C. through a spinneret containing 50 orifices, each of 0.8 mm in diameter, vertically into a funnel through which flowed, in a downward direction, a coagulant bath maintained at 17° C. The coagulant bath consisted of a water/DMSO mixture in a weight ratio of 70/30, respectively, to which mixture 5 g per liter of ammonia were added. The spinning speed was 50 meters per minute, and the vertical path of the filaments was 110 cm. The filaments then passed over a positively driven mechanical device, upon which they executed several turns, and were washed with water at 20° C. while on the device. After the filaments were oiled and dried, they exhibited the following physical characteristics:
- gauge—2.5 dtex
- tenacity, conditioned state—15 g/tex
- elongation, conditioned state—20%
- tenacity, wet—11 g/tex
- elongation, wet—28%

EXAMPLE 7

The cellulose solution of Example 1 was cast upon a glass plate, and spread by means of a doctor blade. The cellulose was precipitated by means of a coagulant bath maintained at 30° C., with the bath consisting of a water/DMSO mixture containing 40% of DMSO. 5 g per liter of ammonia were added to the mixture in the coagulant bath.

The coated glass plate containing the cellulose solution was immersed in the bath, and then removed. A transparent film was obtained, which was washed with cold water to remove remaining solvent, immersed in a 2% strength aqueous solution of glycerol for 15 minutes, and dried on the glass plate at 50° C.

A thick, transparent, limpid and colorless film 0.090 mm thick was obtained. The film had an appearance and characteristics which were similar to those of cellophane.

EXAMPLE 8

240 g of sulphate pulp for viscose, having a DP of 450, dryed at 110° C. during 12 hours, are added to 2,472 g of DMSO and 288 g of paraformaldehyde (paraformaldehyde/cellulose ratio: 1.20). The temperature of the mixture is raised to 130° C. in one hour, with low stirring, and then maintained at 130° C. for 3 hours.

The dissolution of the cellulose observed under a polarising microscope is good (N p about 150). The viscosity of the solution is 1,200 poises at 20° C.

This solution is cold filtered on a nickel gauze of 50 microns mesh size under a pressure of 2 kg/cm2.

It is extruded through a hopper (lip gap: 14/100 mm) in a coagulating bath at 23° C., consisting of a mixture water/DMSO in the ratio 70/30 by weight, in which 15 g/l of ammonia are added.

After a travel of 13.5 cm in this bath (contact time: 4 seconds), the mechanically driven gel is washed with water at 60° C., then in water at room temperature.

It is dryed on a plate.

A transparent, 18 microns thick film is obtained which has an appearance and characteristics close to those of Cellophane.

The loss in width and gel swelling are smaller than in the viscose process.

EXAMPLE 9

The same solution as in example 6 is spread out on a glass plate by means of a hand casting machine, adjusted for a liquid film thickness of 200μ. Then both glass plate and film are sunk into a coagulating bath at 4° C. consisting of a mixture of 60 parts of water, 25 parts of DMSO and 20 parts of an aqueous solution containing 30% of NH$_3$. They are left for 5 minutes in this bath, then the film is washed for 1 hour in distilled water.

A 230μ thick membrane is obtained the ultrafiltration properties of which are tested under a relative pressure of 2 bars, on the one hand with pure water and on the other hand with a solution containing 5 g of beefalbumin of a molecular weight of 70,000 by liter of an aqueous solution at 9 g/l of NaCl and the refusing rate is calculated with the latter solution, by means of the formula $$\frac{\text{initial concentration} - \text{ultrafiltrate concentration}}{\text{initial concentration}} \times 100$$

The obtained outputs are respectively of 230 l/day/m2 for pure water and 222 l/day/m2 for beefalbumin saline solution. The refusing rate is 96%.

What is claimed is:

1. Process for producing shaped articles of cellulose, said process comprising contacting a solution in said shaped form with a coagulant bath containing water, DMSO, and ammonia or an ammonium salt to coagulate said solution therein, the DMSO present in an amount of about 25 to 60 weight percent, based on the amount of DMSO and water, and the ammonia or ammonium salt present in an amount, calculated as ammonia, of at least 1 gram per liter of the mixture of DMSO and water, said solution containing cellulose in dimethylsulphoxide (DMSO) and formaldehyde at a formaldehyde/cellulose weight ratio of about 0.2 to 2 and at a cellulose concentration of at least 6% by weight based on the volume of DMSO.

2. Process of claim 1, wherein said shaped articles are films.

3. Process fo claim 1, wherein the cellulose has a DP of at least 400.

4. Process of claim 3, wherein said shaped articles are filaments.

5. Process of claim 4, including the further step of drawing the filaments.

6. Process of claim 4, wherein said solution is extruded as filaments into said coagulant bath.

7. Process of claim 6, wherein said cellulose has a DP of 400 to 1,100.

8. Process of claim 6, wherein the cellulose concentration is 6 to 20% by weight.

9. Process of claim 8, wherein the extruded filaments are coagulated in said coagulant bath in less than 20 seconds.

10. Process of claim 1, wherein said shaped articles are membranes.

11. Process for producing shaped articles of cellulose, said process comprising shaping a solution containing cellulose in dimethylsulphoxide (DMSO) and formaldehyde at a formaldehyde/cellulose weight ratio of about 0.2 to 2 and at a cellulose concentration of at least 6% by weight based on the volume of DMSO into a coagulant bath containing water, DMSO and ammonia or an ammonium salt, the DMSO present in an amount of about 25 to 60 weight percent, based on the amount of DMSO and water, and the ammonia or ammonium salt present in an amount, calculated as ammonia, of at least 1 gram per liter of the mixture of DMSO and water.

* * * * *